(12) United States Patent
Hanson (10) Patent No.: US 10,631,596 B2
(45) Date of Patent: Apr. 28, 2020

(54) GUIDE WALL ATTACHMENT DEVICE FOR A SEAT BELT RECEIVER

(71) Applicant: Eunice Hanson, New Berlin, WI (US)

(72) Inventor: Eunice Hanson, New Berlin, WI (US)

(73) Assignee: Eunice Hanson, New Berlin, WI (US)

( * ) Notice: Subject to any disclaimer, the term of this patent is extended or adjusted under 35 U.S.C. 154(b) by 13 days.

(21) Appl. No.: 15/679,370

(22) Filed: Aug. 17, 2017

(65) Prior Publication Data

US 2018/0049518 A1 Feb. 22, 2018

Related U.S. Application Data (60) Provisional application No. 62/377,023, filed on Aug. 19, 2016.

(51) Int. Cl.
*A44B 11/25* (2006.01)
*B60R 22/18* (2006.01)

(52) U.S. Cl.
CPC ...... *A44B 11/2546* (2013.01); *A44D 2211/00* (2013.01); *B60R 22/18* (2013.01); *B60R 2022/1818* (2013.01)

(58) Field of Classification Search
CPC ........ A44B 11/2546; B60R 2022/1818; B60R 2022/1843; B60R 2022/1806; B60R 2022/1812; B60R 22/18; Y10T 24/45602; Y10T 24/4051; Y10T 24/4095; Y10T 24/45084; Y10T 24/45623; A44D 2211/00

See application file for complete search history.

(56) References Cited

U.S. PATENT DOCUMENTS

| 4,939,824 | A | * | 7/1990 | Reed ................. A44B 11/2576 24/579.11 |
| 5,165,149 | A | * | 11/1992 | Nihei ................. A44B 11/2503 24/633 |
| 5,617,617 | A | | 4/1997 | Gustin |
| 5,620,234 | A | | 4/1997 | Gunby |
| 7,011,375 | B1 | | 3/2006 | Tyler |
| 7,383,620 | B2 | | 6/2008 | Smith |
| 2005/0121967 | A1 | | 6/2005 | Crowl |

(Continued)

FOREIGN PATENT DOCUMENTS

| FR | 2933576 A1 * 1/2010 ......... A44B 11/2546 |
| WO | WO-2008128578 A1 * 10/2008 .......... A44B 1/2546 |

(Continued)

OTHER PUBLICATIONS

Machine translation of foreign reference WO2012/089402, obtained from https://patentscope.wipo.int/search/en/detail.jsf?docId=WO2012089402&tab=PCTDESCRIPTION&maxRec=1000#atapta0 (last accessed on Oct. 25, 2018) (Year: 2018).*

(Continued)

*Primary Examiner* — Theodore V Adamos
(74) *Attorney, Agent, or Firm* — Boyle Fredrickson, S.C.

(57) ABSTRACT

A guide wall attachment device includes a guide wall having a front side and a back side, an attachment means extending from the front side of the guide wall at a first location to the front side of the guide wall at a second location, and an opening disposed between an inner surface of the attachment means and the front side of the guide wall. The opening is configured to receive and secure a seat belt receiver.

19 Claims, 9 Drawing Sheets

(56) References Cited

U.S. PATENT DOCUMENTS

| 2005/0241123 | A1* | 11/2005 | Willard | A44B 11/2576 |
| | | | | 24/633 |
| 2016/0021987 | A1* | 1/2016 | Murase | B60R 22/02 |
| | | | | 24/684 |
| 2016/0214567 | A1* | 7/2016 | Harada | B60R 22/18 |
| 2016/0214568 | A1* | 7/2016 | Harada | B60R 22/18 |

FOREIGN PATENT DOCUMENTS

| WO | WO-2012089401 A1 * | 7/2012 | B60N 2/2803 |
| WO | WO-2012089402 A1 * | 7/2012 | A44B 1/2546 |

OTHER PUBLICATIONS

Machine translation of foreign reference WO2012/089401, obtained from https://patentscope.wipo.int/search/en/detail.jsf?docId=WO2012089401&tab=PCTDESCRIPTION&_cid=P12-K40JQK-10512-1 (last accessed on Dec. 11, 2019) (Year: 2019).*

Machine translation of foreign reference FR 2933576, obtained from https://patentscope.wipo.int/search/en/detail.jsf?docId=FR186965386&tab=PCTDESCRIPTION&_cid=P12-K41GTE-27655-1 (last accessed on Dec. 11, 2019) (Year: 2019).*

Machine translation of foreign reference WO2008128578, obtained from https://patentscope.wipo.int/search/en/detail.jsf?docId=WO2008128578&_cid=P12-K41HEI-33149-1 (last accessed on Dec. 11, 2019) (Year: 2019).*

\* cited by examiner

GUIDE WALL ATTACHMENT DEVICE FOR A SEAT BELT RECEIVER

CROSS-REFERENCE TO RELATED APPLICATION

This application claims priority to U.S. Provisional Application No. 62/377,023, filed on Aug. 19, 2016, the entire contents of which are hereby expressly incorporated by reference into this application.

BACKGROUND OF THE INVENTION

In most vehicles today, a seat belt receiver is coupled to a passenger seat in a way that relocates the seat belt receiver in a location alongside the seat. In some instances, the seat belt receiver is disposed in a location between the seat and another object, such as a storage armrest box. This location can make it difficult for a passenger to locate and grab the seat belt receiver.

In the wintertime, passengers may also wear clothing that the seat belt receiver can get caught up in. These articles of clothing can include coats, jackets, sweaters, shirts, and the like. That is, when a passenger sits down in the seat, the seat belt receiver can get entangled in the passenger's clothing, which in turn can make it difficult for the passenger to locate and grab the seat belt receiver.

As such, there is need in the art for a guide wall attachment device that may be removably coupled to a seat belt receiver in order to assists a user with finding the seat belt receiver. The guide wall attachment may be of sufficient size and shape so as to prevent the seat belt receiver from relocating to a position alongside the passenger seat that makes it difficult for a user to locate and grab the seat belt receiver. In addition, the guide wall attachment device may be of sufficient size and shape so as to prevent the seat belt reliever from becoming entangled in a passenger's clothing, such as, but not limited to, a winter coat.

SUMMARY OF THE INVENTION

A guide wall attachment device for a seat belt receiver for providing a locator for a seat belt receiver, a guide for a seat belt receiver, and a protector for a passenger's clothes and body from a seat belt receiver.

According to an embodiment of the invention, a guide wall attachment device for a seat belt receiver includes a guide wall and an attachment means extending from a front side of the guide wall and configured to removably couple the guide wall attachment to the seat belt receiver.

In accordance with another aspect of the invention, the attachment means includes a first strap extending from a first location of the front side of the guide wall and a second strap extending from a second location of the front side of the guide wall. The first and second straps are engageable with each other about the seat belt receiver. In addition, the first and second straps are removably coupled to each other.

In accordance with yet another aspect of the invention, the attachment means includes a strap having a first end extending from the front side of the guide wall at a first location and a second end extending from the front side of the guide wall at a second location. The strap and the guide wall surround an opening configured to receive the seat belt receiver. Further, the opening has a circumference less than or equal to a circumference of the seat belt receiver in a neutral position thereof and may be increased to allow the seat belt receiver to be received within the opening.

According to another embodiment of the invention, a method of assisting a user with locating a seat belt receiver includes removably coupling a guide wall attachment device to the seat belt receiver. The guide wall attachment device includes a guide wall and an attachment means extending from a first location of a front side of the guide wall to a second location of the front side of the guide wall. In addition, the method may also include grabbing the guide wall by way of an opening formed through the guide wall.

In accordance with yet another embodiment of the invention, removably coupling the guide wall attachment device to the seat belt receiver includes securing a first strap of the attachment means to a second strap of the attachment means in order to surround the seat belt receiver.

In accordance with another embodiment of the invention removably coupling the guide wall attachment device to the seat belt receiver includes disposing the seat belt receiver within an opening formed between the guide wall attachment device and the front side of the guide wall. The attachment means includes a strap having a first end extending from the front side of the guide wall at a first location to a second end extending from the front side of the guide wall at a second location. Further, the strap may be a stretchable material that allows adjustability of a circumference of the opening formed between the strap and the front surface of the guide wall.

According to yet another embodiment of the invention, a guide wall attachment device includes a guide wall having a front side and a back side, an attachment means extending from the front side of the guide wall at a first location to the front side of the guide wall at a second location, and an opening disposed between an inner surface of the attachment means and the front side of the guide wall. The opening is configured to receive and secure a seat belt receiver therein.

In accordance with another embodiment of the invention, the attachment means includes a first strap extending from a first end aligned with the first location on the front side of the guide wall to a second end and a second strap extending from a first end aligned with the second location on the front side of the guide wall to a second end. A portion of the first strap adjacent its second end and a portion of the second strap adjacent its second end are removably secured to each other.

In accordance with yet another embodiment of the invention, the attachment means is a single strip extending from a first end aligned with the first location on the front side of the guide wall to a second end aligned with the second location on the front side of the guide wall. The single strap comprises a stretchable material configured to allow a circumference of the opening to be increased.

In accordance with another embodiment of the invention, an inner surface of the attachment means comprises a material having a coefficient of friction sufficient to cling to the seat belt receiver.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

DETAILED DESCRIPTION OF THE DRAWINGS

The present invention and the various features and advantageous details thereof are explained more fully with reference to the non-limiting embodiments described in detail in the following description.

Figure 1:
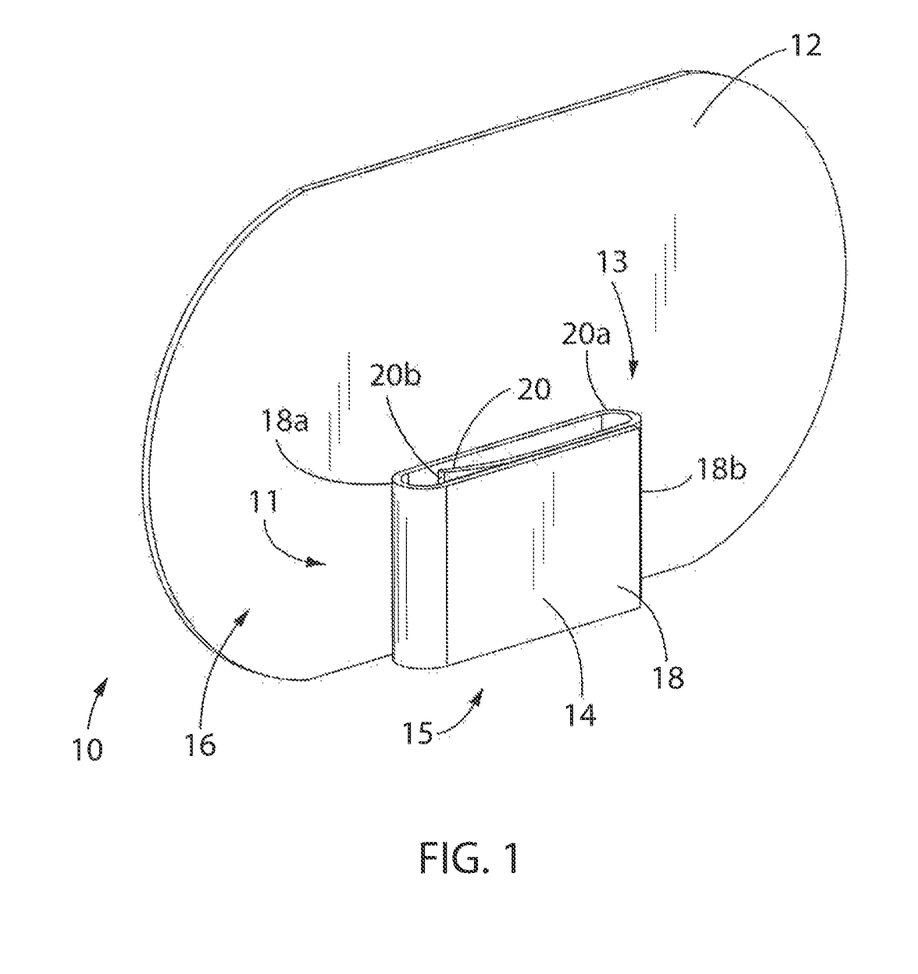
FIG. 1 is a perspective view of a guide wall attachment, according to an embodiment of the invention.
Figure 2:
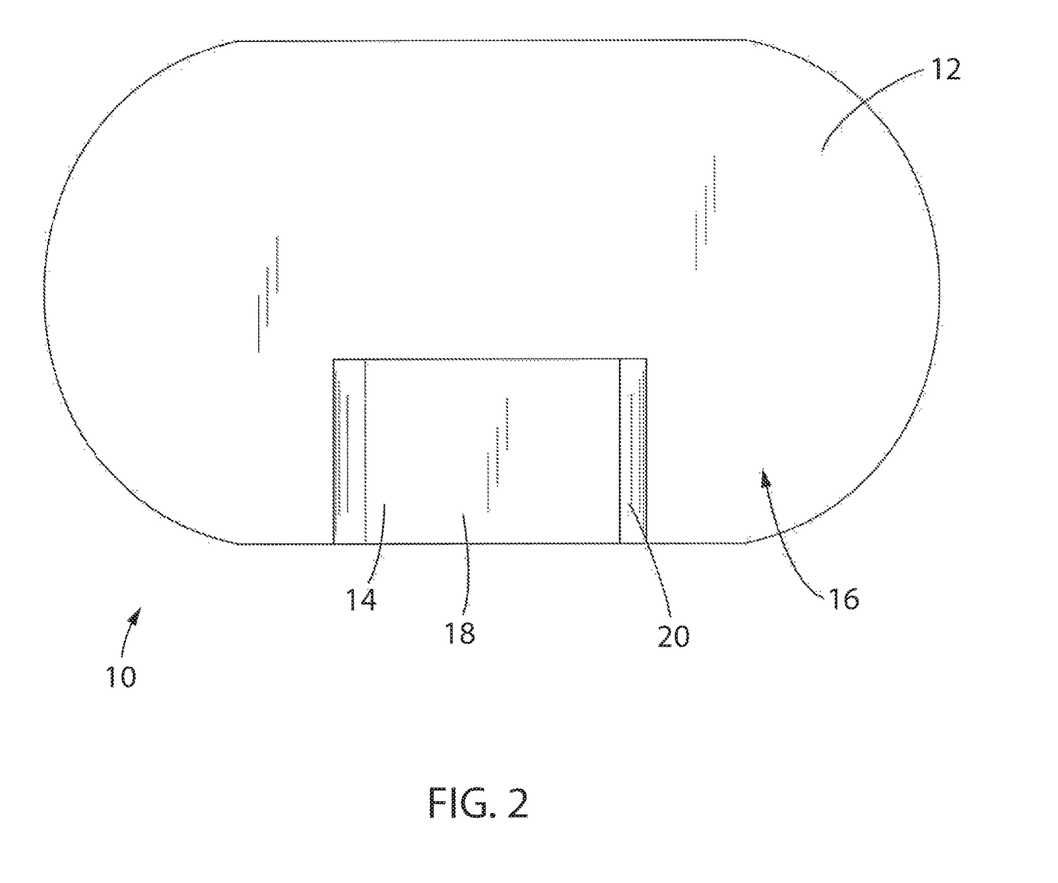
FIG. 2 is a front view of the guide wall attachment of FIG. 1, according to an embodiment of the invention.

FIGS. 1 and 2 show a perspective view and a front view of a guide wall attachment device 10, respectively. The guide wall attachment device 10 includes a guide wall 12 and an attachment means 14. The attachment means 14 is coupled to a front side 16 of the guide wall 12 via any method known in the art. For example, but not limited to, the attachment means 14 may be sewn to the guide wall 12, or the attachment means 14 may be adhered to the guide wall 12 by way of an adhesive. In an alternative embodiment of the invention, the attachment 14 means may be formed integrally with the front side 16 of the guide wall 12.

Figure 4:
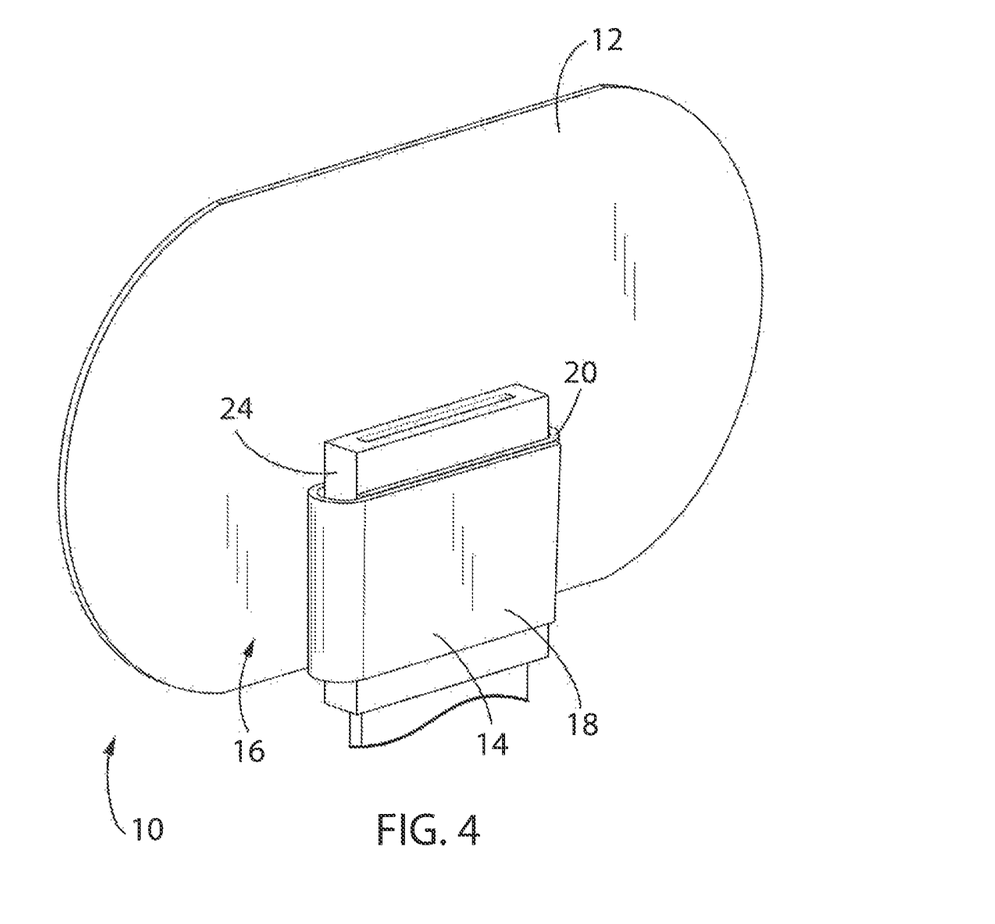
FIG. 4 is a perspective view of the guide wall attachment of FIG. 1 in use with a seat belt receiver, according to an embodiment of the invention.

The attachment means 14 is used to removably couple the guide wall attachment device 10 to a seat belt receiver 24, as seen in FIG. 4. In a representative embodiment of the invention, the attachments means 14 comprises a first strap 18 extending from the guide wall 12 and a second strap 20 extending from the guide wall 12. The first strap 18 and the second strap 20 are then wrapped around a seat belt receiver 24, in order to secure the guide wall attachment device 10 to the seat belt receiver 24. In this instance, the first strap 18 may be secured to the second strap 20 by a hook-and-loop fastening system such as Velcro or any other known alternatives. Additionally, the inner surfaces of the first and second straps 18, 20 may comprise a material having a high coefficient of friction so that the guide wall attachment device 10 does not slip off of the seat belt receiver 24.

Figure 3:
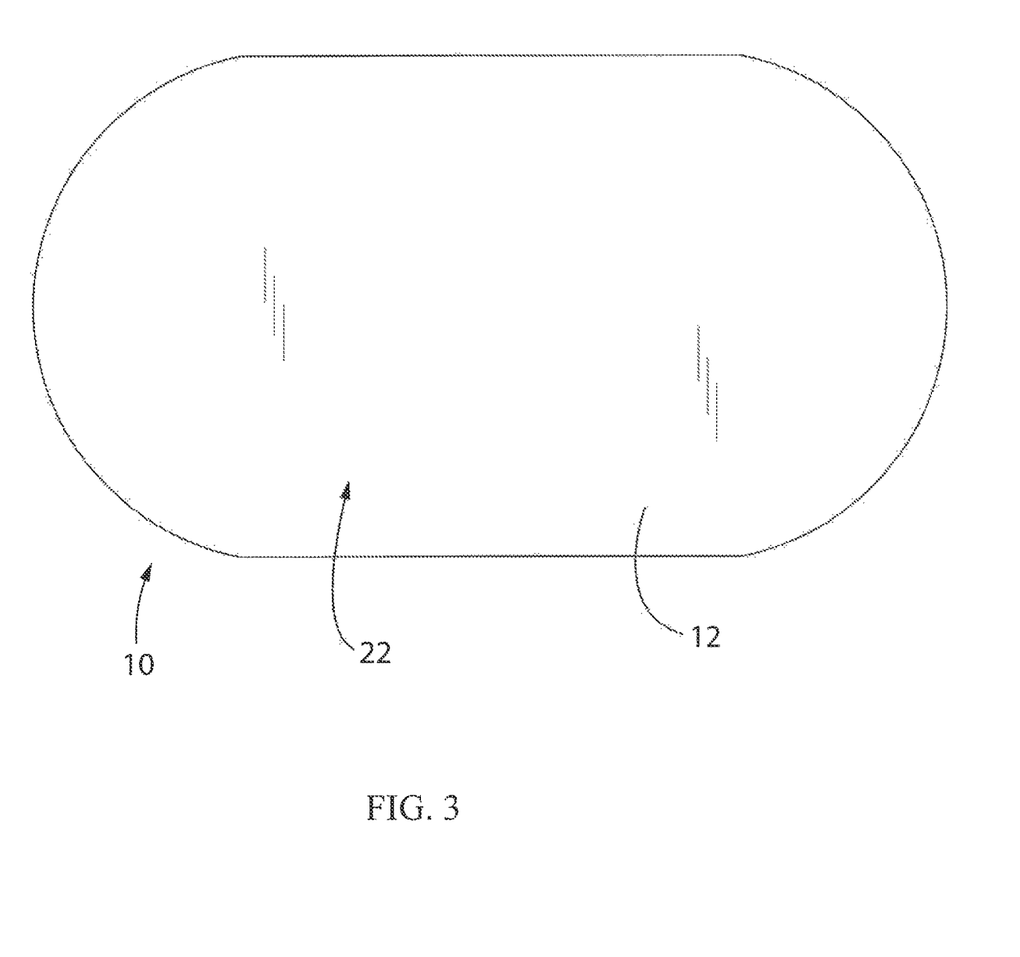
FIG. 3 is a rear view of the guide wall attachment of FIG. 1, according to an embodiment of the invention.

As shown in FIGS. 1-3, the first strap 18 extends from the guide wall 12 at a first location 11 and the second strap 20 extends from the guide wall 12 at a second location 13. The first strap 18 includes a first end 18a aligned with the first location 11. Similarly, the second strap 20 includes a first end 20a aligned with the second location 13. The first and second straps 18, 20 also include second ends 18b, 20b, respectively. A portion of the first strap 18 adjacent the second end 18b overlaps with a portion of the second strap 20 adjacent the second end 20l in order to secure the first and second straps 18, 20 together by means described above. When the first strap 18 and the second strap 20 are secured to each other, an opening 15 is formed between the inner surfaces of the first and second straps 18, 20 and the front side 16 of the guide wall 12.

In another embodiment of the invention, the first strap 18 and the second strap 20 may be integrally coupled so that the attachment means 14 is a single strap configured to surround the seat belt receiver 24. In this instance, the inner surface of the single strap formed by the first and second straps 18, 20 may comprise a material having a high coefficient of friction so that the guide wall device 10 is secured to the seat belt receiver 24 and does not slip off.

Alternatively, the attachment means may be in the form of a loop or sleeve of material that is secured to the guide wall 14 and configured to surround the seat belt receiver 24. The loop or sleeve of material may, for example, be formed of a resilient stretchable material having a passage smaller than the seat belt receiver 24 and that can be stretched to position the seat belt receiver 24 therein. Again, the loop or sleeve may itself be formed of a material having a high coefficient of friction or may have a high coefficient of friction material applied to its inside surfaces so as allow the attachment means to cling to the seat belt receiver.

As shown in FIG. 3, a back side 22 of the guide wall 12 is a generally smooth and flat surface, without anything attached thereto. This allows the guide wall 12 to rest comfortably against the user and prevent the guide wall attachment device 10 from being caught in the user's clothing. For example, the seat belt receiver 24 may become buried in a user's coat, such as winter coat. The guide wall 12 provides a larger surface area so as to prevent the seat belt receiver 24 from become tangled in a user's clothing. In addition, the surface area of the guide wall 12 minimizes wrinkling of a user's clothing when using the guide wall attachment device 10.

While the representative embodiment of the invention shows the guide wall 12 in a generally oval shape, it is contemplated that the guide wall 12 may be in the form of any shape and/or size.

Now referring to FIGS. 5-8, a number of views of a guide wall attachment device 26 are shown, according to another embodiment of the invention. Similar to the guide wall attachment device 10 of FIGS. 1-4, the guide wall attachment device of FIGS. 5-8 includes a guide wall 28 and an attachment means 30. The attachment means 30 is integrally formed with a front side 32 of the guide wall 28 and extends outward from the front side 32 of the guide wall 28 at a first location 34 and a second location 36. In the representative embodiment of the invention, the first and second locations 34, 36 are spaced apart from each other by a distance approximately the width of a seat belt receiver 38.

In other embodiments of the invention, the attachment means 30 may be coupled to the front side 32 of the guide wall 28 at the first and second locations 34, 36 by way of any method known in the art, such as, but not limited to, sewing or an adhesive.

In a representative embodiment of the invention, the attachment means 30 comprises a single strap 40 that extends from a first end 39 aligned with the first location 34 to a second end 41 aligned with the second location 36 to create an opening 42 disposed between the attachment means 30 and the front side 32 of the guide wall 28. The circumference of the opening 42 is configured to be less than, equal to, or slightly greater than the circumference of the seat belt receiver 38.

The attachment means 30 may be formed of a resilient stretchable material, resulting in a stretchable strap 40. In such an embodiment of the invention, the circumference of the opening 42 may be less than the circumference of the seat belt receiver 38 when the strap 40 is in a neutral position. The strap 40 may be stretched to increase the circumference of the opening 42 and allow the seat belt receiver 38 to be positioned within the opening 42. The strap 40 may then contract to reduce the circumference of the opening 42 and secure the seat belt receiver 38 within the opening 42.

In alternative embodiments of the invention, the strap 40 may include an inner surface 44 having a high coefficient of friction so as to cling to the seat belt receiver 38. In such an embodiment of the invention the circumference of the opening 42 range from less than to slightly greater than the circumference of the seat belt receiver 38. The inner surface 44 effectively clings to the seat belt receiver 38 to prevent the guide wall attachment device 26 from slipping off of the seat belt receiver 38.

Figure 9:
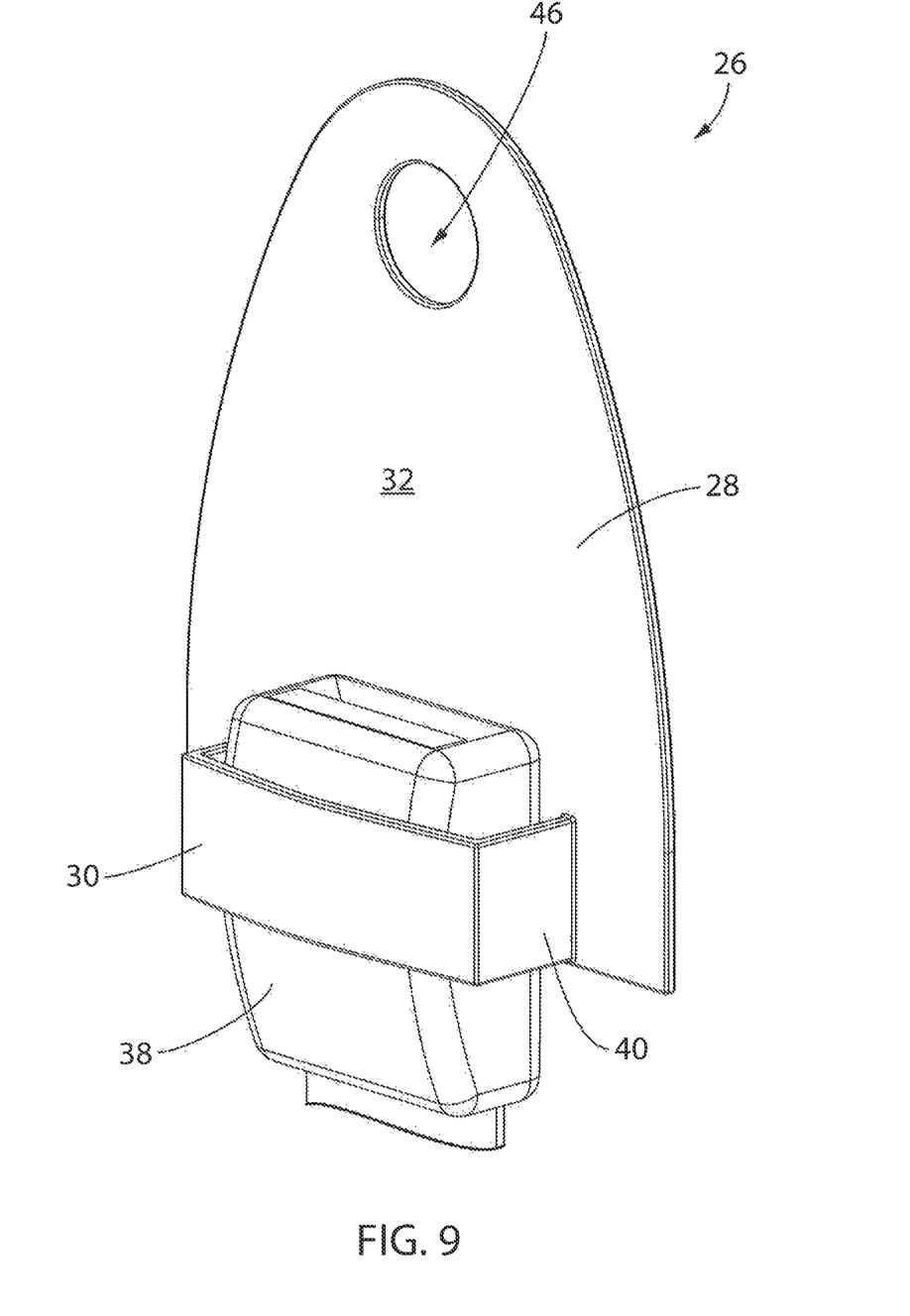
FIG. 9 is a perspective view of the guide wall attachment of FIG. 5 in use with a seat belt receiver, according to an embodiment of the invention.

FIG. 9 illustrates the seat belt receiver 38 disposed within the opening 42 and surrounded by the attachment means 30, as described above. The stretchable material and material having a high coefficient of friction described above may be used alone or in conjunction with each other in embodiments of the invention.

Figure 5:
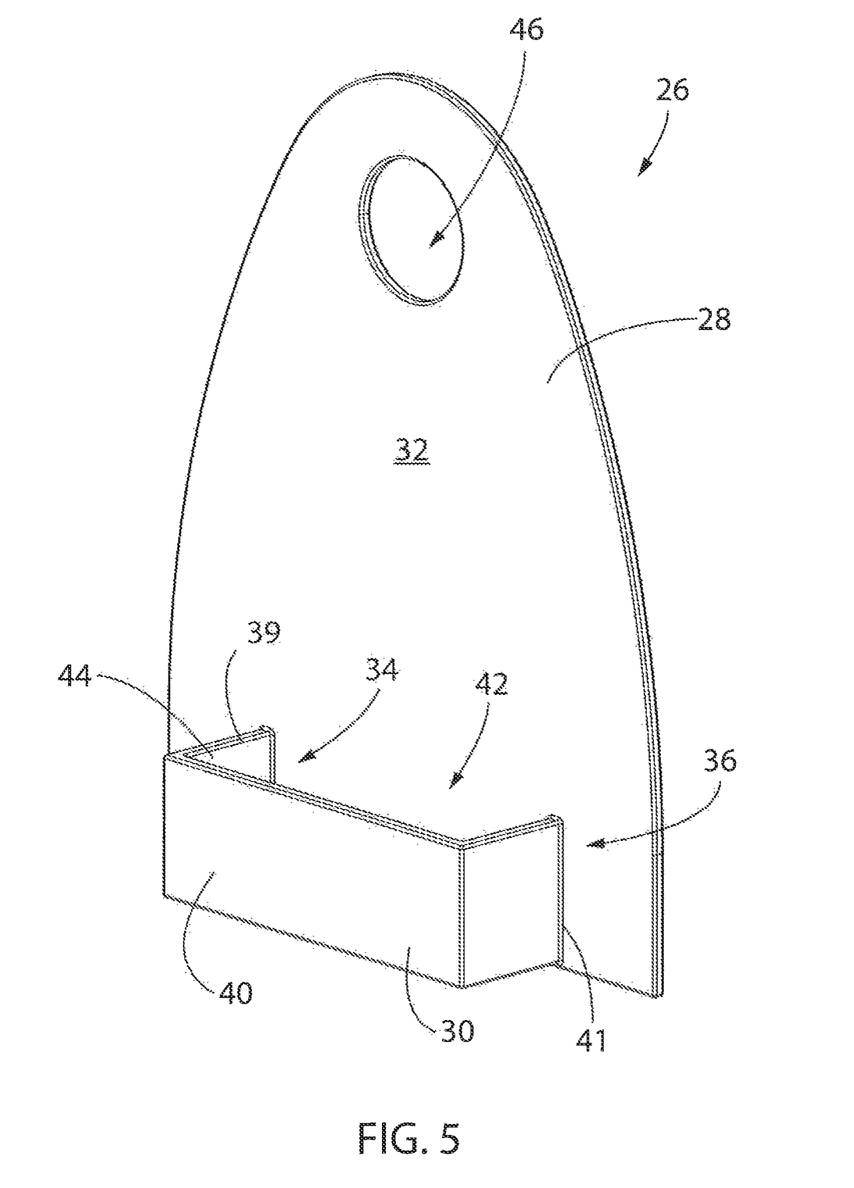
FIG. 5 is a perspective view of a guide wall attachment, according to another embodiment of the invention.
Figure 6:
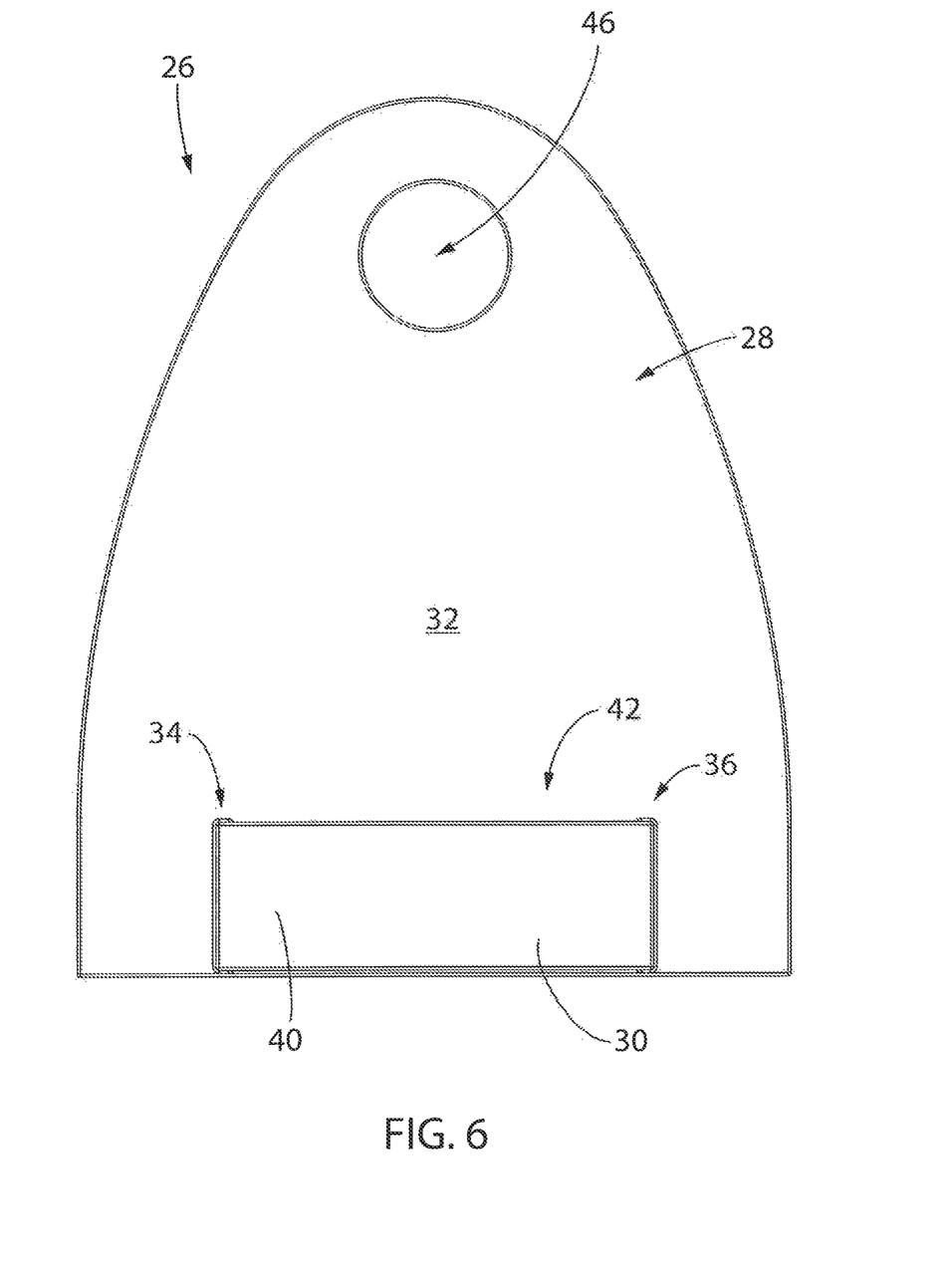
FIG. 6 is a front view of the guide wall attachment of FIG. 5, according to an embodiment of the invention.
Figure 7:
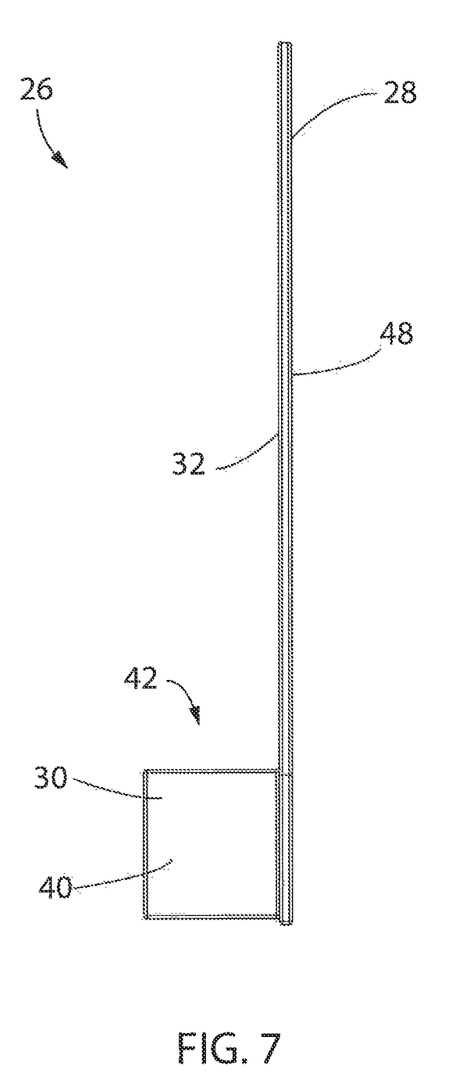
FIG. 7 is a side view of the guide wall attachment of FIG. 5, according to an embodiment of the invention.
Figure 8:
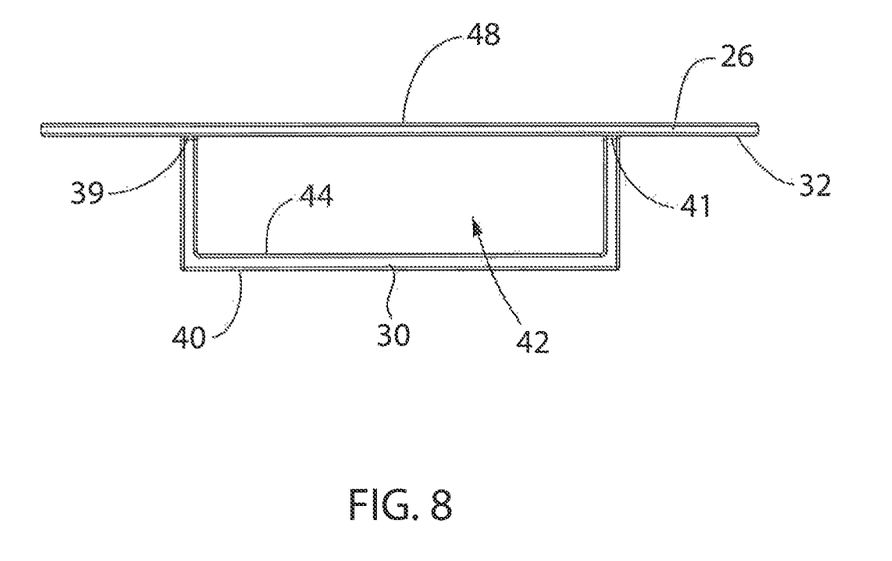
FIG. 8 is a top view of the guide wall attachment of FIG. 5, according to an embodiment of the invention.

In the representative embodiment of the invention, an opening 46 is formed through the guide wall 28 of the guide wall attachment device 26. The opening 46 extends from the front side 32 of the guide wall 28 to a back side 48 of the guide wall 28. The opening 46 allows a user to easily grab the guide wall attachment device 26. While FIGS. 5 and 6, illustrate the opening 46 being located in the upper portion of the guide wall 28, it is contemplated that the opening 46 may be located anywhere on the guide wall 28. In operation, a user can insert a finger through opening 46 to assist in positioning receiver 38 in a manner that facilitates engagement with the seat belt.

While the representative embodiment of the invention shows the guide wall 28 in a generally oblong shape, it is contemplated that the guide wall 28 may be in the form of any shape and/or size.

In some vehicles, the seat belt receiver 24/38 is coupled to a passenger seat in a way that the seat belt receiver 24/38 is able to relocate to a position alongside the passenger seat that is difficult to locate and grab the seat belt receiver 24/38. As such, the guide wall 12/28 assists a user with finding the seat belt receiver 24/38. It is also contemplated that the guide wall 12/28 may be large enough to prevent the seat belt receiver 24/38 from relocating to a position alongside the passenger seat that is difficult to locate and grab the seat belt receiver 24/38.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications, and rearrangements are contemplated as being within the scope of the following claims, which particularly point out and distinctly claim the subject matter regarding as the invention, and it is intended that the following claims cover all such additions, modifications, and rearrangements.

I claim:

1. A guide wall attachment device for a seat belt receiver, comprising:
   a seat belt receiver; and
   a guide wall attachment device, comprising a planar guide wall and an attachment means extending from and positioned within a perimeter of a front side of the planar guide wall, wherein the attachment means defines an opening and wherein the seat belt receiver is positioned within the opening, and wherein the attachment means is configured to removably couple the guide wall attachment device to the seat belt receiver;
   wherein the planar guide wall includes a guide surface extending outwardly from the seat belt receiver and leading to the opening defined by the attachment means, wherein the attachment means is configured to retain the seat belt receiver within the opening.

2. The guide wall attachment device of claim 1 wherein the attachment means comprises a first strap extending from a first location of the front side of the guide wall and a second strap extending from a second location of the front side of the guide wall; and
   wherein the first and second straps are engageable with each other about the seat belt receiver.

3. The guide wall attachment device of claim 2 wherein the first strap and the second strap are removably coupled to each other.

4. The guide wall attachment device of claim 1 wherein the attachment means comprises a strap having a first end extending from the front side of the guide wall at a first location and a second end extending from the front side of the guide wall at a second location; and
   wherein the strap and the guide wall surround the opening configured to receive the seat belt receiver.

5. The guide wall attachment device of claim 4 wherein the opening has a circumference less than or equal to a circumference of the seat belt receiver in a neutral position thereof; and
   wherein the circumference of the opening may be increased to allow the seat belt receiver to be received within the opening.

6. The guide wall attachment device of claim 1 wherein the guide wall includes an orifice extending therethrough.

7. The guide wall attachment device of claim 1 wherein the guide surface extends outwardly from the seat belt receiver in a longitudinal direction of the seat belt receiver.

8. A guide wall attachment device for a seat belt receiver, comprising:
   a seat belt receiver; and
   a guide wall attachment device, comprising a planar guide wall having a front side and a back side, and an attachment means extending from the front side of the planar guide wall at a first location to the front side of the planar guide wall at a second location, the first and second locations being spaced inward from an edge of the front side of the planar guide wall; and
   an opening disposed between an inner surface of the attachment means and the front side of the planar guide wall, wherein the seat belt receiver is positioned within the opening;
   wherein the guide wall has a width greater than a width of the opening; and
   wherein the front side of the guide wall includes a guide surface extending outwardly from the seat belt receiver and leading to the opening.

9. The guide wall attachment device of claim 8 wherein the attachment means comprises:
   a first strap extending from a first end aligned with the first location on the front side of the guide wall to a second end; and
   a second strap extending from a first end aligned with the second location on the front side of the guide wall to a second end.

10. The guide wall attachment device of claim 9 wherein a portion of the first strap adjacent the second end thereof and a portion of the second strap adjacent the second end thereof are removably secured to each other.

11. The guide wall attachment device of claim 8 wherein the attachment means is a single strip extending from a first end aligned with the first location on the front side of the guide wall to a second end aligned with the second location on the front side of the guide wall.

12. The guide wall attachment device of claim 11 wherein the single strap comprises a stretchable material configured to allow a circumference of the opening to be increased.

13. The guide wall attachment device of claim 8 wherein the guide wall further comprises an orifice extending from the front side to the rear side thereof.

14. A method of assisting a user with locating a seat belt receiver, the method comprising:
   removably coupling a guide wall attachment device to the seat belt receiver, the guide wall attachment device comprising:
      a guide wall;
      an attachment means extending from a first location of a front side of the guide wall to a second location of the front side of the guide wall, wherein the attachment means defines an opening;
   wherein removably coupling the guide wall attachment to the seat belt receiver comprises positioning the seat belt receiver within the opening;
   wherein the front side of the guide wall has a guide surface extending outwardly from the seat belt receiver and leading toward the opening, wherein the attachment means is configured to surround the seat belt receiver and retain the seat belt receiver within the opening; and
   wherein the attachment means is disposed within a perimeter of the guide wall.

15. The method of claim 14 wherein removably coupling the guide wall attachment device to the seat belt receiver includes securing a first strap of the attachment means to a second strap of the attachment means in order to surround the seat belt receiver.

16. The method of claim 14 wherein removably coupling the guide wall attachment device to the seat belt receiver includes surrounding the seat belt receiver within the opening formed between the guide wall attachment device and the front side of the guide wall.

17. The method of claim 16 wherein the attachment means comprises a strap having a first end extending from the front side of the guide wall at a first location to a second end extending from the front side of the guide wall at a second location.

18. The method of claim 17 wherein the strap comprises a stretchable material allowing adjustability of a circumference of the opening formed between the strap and the front side of the guide wall.

19. The method of claim 17 further comprising grabbing the guide wall by way of an opening formed through the guide wall.

* * * * *